Feb. 20, 1934. G. S. LANE 1,947,719
DEVICE TO PREVENT THE SCORING OF A BRAKE DRUM
Original Filed Oct. 28, 1930
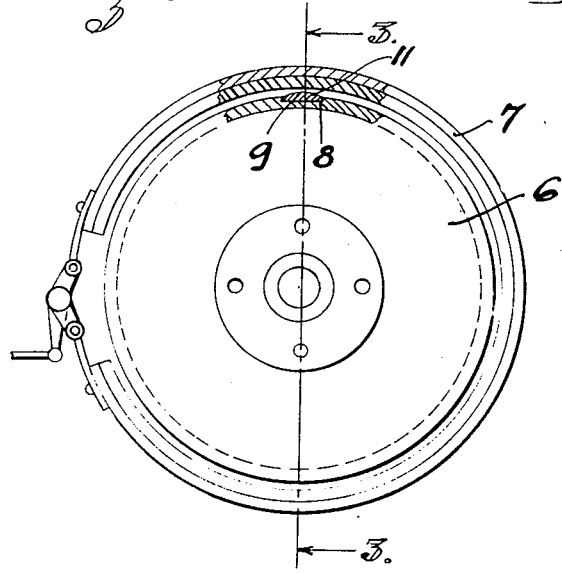
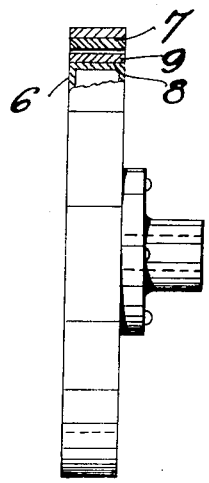
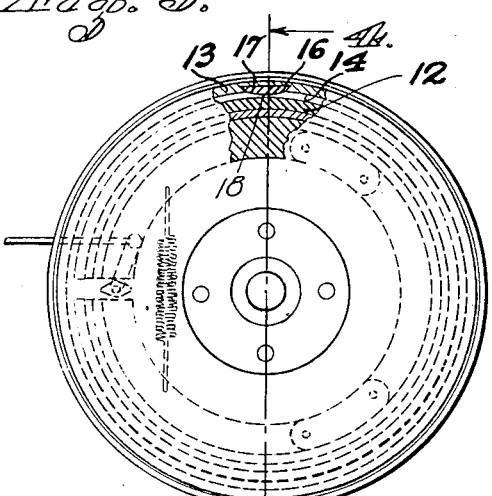
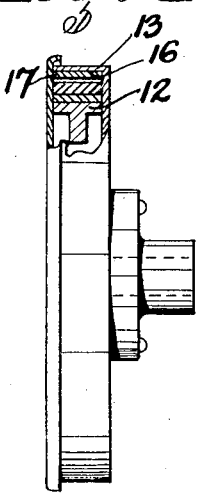
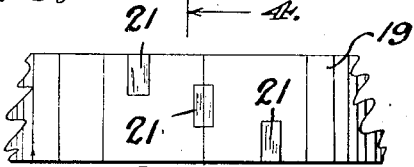
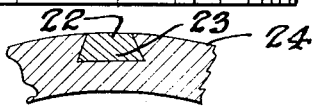
INVENTOR.
GEORGE S. LANE.
BY
ATTORNEYS.

Patented Feb. 20, 1934

1,947,719

UNITED STATES PATENT OFFICE 1,947,719

DEVICE TO PREVENT THE SCORING OF A BRAKE DRUM

George S. Lane, Ridgewood, N. J.

Application October 28, 1930, Serial No. 491,697
Renewed June 29, 1933

6 Claims. (Cl. 188—218)

This invention relates to a device for the prevention of brake drum scoring.

The scoring of a brake drum is usually caused by a centralization or localization of concentrated pressure thereon. The brake drums are so designed and made of such material to provide for a uniformly distributed pressure over the facings presented for friction. At the uniform unit-pressure for which the brake is designed, the facings and the opposed metallic faces are capable of long, efficient service. If from any cause a concentration of pressure takes place a local breaking down of the materials ensues, causing intensified heat production at a point which is progressively intensified with its consequent effect upon the drum and the facings.

Scale, chips, sand, cross-placed amphibole asbestos are all capable, under pressure, of severely scoring a steel surface. As an example, with a commonly attained total braking force of, for instance, 3000 lbs., intended to be distributed to four wheels, in other words 750 lbs. per wheel, the unit pressure on lining is, by computation, about 15 lbs. per sq. inch. When, however, maladjustment, introduction of sand or the like, concentrates the pressure, and the wheel with good tractive effect is revolving rapidly, pressures of hundreds of pounds per sq. inch can attain. The irritating material is thus confined in place and under such conditions, any normally soft material can become abrasive. The scoring of the drum caused by such abrasive action reduces the friction area, concentrates pressure, and is the forerunner of complete destruction of the brake as a decelerating means.

The primary object of this invention is the provision of a device to prevent the scoring of a brake drum by any particle on the lining or between the lining of the drum; the drum being so constructed, that any foreign article in the lining or hard pieces of asbestos or the like, are crushed or ground up, or faced down into the lining so as to prevent the concentration of pressure thereat and obviate the scoring of the drum; the action of such means in effect, burnishes the brake lining.

Other objects and advantages are to provide a device for the prevention of brake drum scoring, that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawing, wherein:

Fig. 1 is a face view, partly in section, of an external brake, constructed in accordance with my invention.

Fig. 2 is a side view of the external brake, partly in section.

Fig. 3 is a face view of an internal brake constructed in accordance with my invention; and Fig. 4 is a side view of the internal brake.

Fig. 5 is a fragmental view of a brake drum having a plurality of scoring strips, extending across respective portions of the frictional surface of the drum.

Fig. 6 is a sectional view of a scoring strip, arrangement in the drum, the strip being flush with the rubbing surface of the drum.

Referring to Figs. 1 and 2, my invention is incorporated into an external brake, of the usual construction, having a rotary brake drum 6 and an external band and lining 7, around the drum 6. At a point of the outer periphery of the drum 6 is formed an indentation or groove 8 of dovetail cross section, extending across the full width of the rubbing surface of the drum 6. Into the dovetail groove 8 is firmly secured a metal strip 9, the metal being of harder texture than the brake drum material. Very hard tungsten steel is particularly adapted for this purpose, because the heat does not soften it excessively. The outer face 11 of the strip 9 projects beyond the rubbing surface of the drum 6, so that any metal particles in the lining or hard pieces of asbestos are crushed or ground thereby or faced into the rubbing surface of the lining. Furthermore, sand or other foreign particles between the lining and the drum are carried only up to said projection, are stopped thereby, and either ejected from between the lining and the drum, or broken up by the force applied thereto and then eliminated, whereby the scoring of the drum is prevented. The dovetail groove 8 is preferably chrome plated, or case hardened.

In Figs. 3 and 4, an internal expansion brake is shown, wherein the internal brake band and lining 12 is disposed within a rotary drum 13, the inner periphery 14 of the drum 13 being the rubbing surface of the brake. At a point of the inner periphery of the drum 13, is formed an internal dovetail groove 16, into which is secured a metal strip 17 similarly to the aforementioned strip 9. The projecting inner face 18 of the strip 17 operates similarly to the strip 9 to obviate the scoring of the rubbing surface of the drum.

In some instances the scoring strip is extended only across a portion of the width of the rubbing surface of the drum, as shown in Fig. 5. On the rubbing surface of a drum 19, are disposed a plurality of strips 21, disposed in staggered relation, each extending across a portion of the width of the rubbing surface. This arrangement may be used as well as a plurality of spaced strips extending entirely across the width of the said drum rubbing surface.

The strips may be protruding beyond the drum rubbing surface as heretofore described, or the outer or scoring side 22 of the strip 23 is made flush with the drum rubbing surface 24.

Having thus described this invention, what I claim and desire to secure by Letters Patent is:

1. In combination a brake drum and a band of flexible material to frictionally engage the drum, and a strip of metal of harder texture than the brake drum material, arranged transversely across the braking surface of the drum and projected beyond the face thereof toward the friction material.

2. A metal brake drum having a strip of metal, of harder texture than that of which the brake drum is formed, embedded in the braking face of the drum across the width thereof and projected a slight distance out of the plane of said braking face.

3. A metal brake drum of cylindrical cross section having a braking face formed on one circumference thereof; and a strip of material of harder texture than the drum confined therein to project above the plane of the braking face and to extend across the width of said braking face.

4. In combination, a brake drum and a braking element to contact the drum, and a projection on the drum face to interrupt the circumference thereof and to prevent abrasive material confined between the drum and braking element from engaging the drum face uniformly throughout the entire circumference thereof.

5. In combination, a metal brake drum and a braking element to contact the drum; a metal insert of harder texture than the brake drum metal countersunk in the drum face across the width thereof and projected a slight distance thereabove, to interrupt the circumference of the drum and to prevent abrasive material confined between the drum and braking element from engaging the drum face uniformly throughout the entire circumference thereof.

6. A metal brake drum having a plurality of circumferentially spaced strips of metal embedded in the rubbing surface thereof, said strips being of harder texture than the metal of which the said drum is formed, each of said strips extending across a portion of the width of the drum rubbing surface and being arranged in a parallel, staggered relation to each other.

GEORGE S. LANE.